United States Patent [19]

Wood et al.

[11] Patent Number: 5,142,384
[45] Date of Patent: Aug. 25, 1992

[54] HOLOGRAMS FOR PACKAGING AND DISPLAY USES

[75] Inventors: Glenn P. Wood, Hale; Anthony I. Hopwood, Bollington, both of United Kingdom

[73] Assignee: Ilford Limited, Chesire, United Kingdom

[21] Appl. No.: 519,854

[22] Filed: May 7, 1990

[30] Foreign Application Priority Data

Jun. 8, 1989 [GB] United Kingdom ............... 8913195
Nov. 14, 1989 [GB] United Kingdom ............... 8925676

[51] Int. Cl.⁵ .................... G03H 1/02; B65D 73/00
[52] U.S. Cl. .................................... 359/3; 359/1; 206/457; 206/459.1
[58] Field of Search ............ 206/457, 459, 485, 316.1; 430/1, 2; 350/3.61, 3.64, 3.6; 359/1, 3, 7

[56] References Cited

U.S. PATENT DOCUMENTS

| | | | |
|---|---|---|---|
| 3,121,511 | 2/1964 | Whitehead | 206/457 X |
| 3,552,853 | 3/1968 | Sanders et al. | 355/133 |
| 3,967,963 | 7/1976 | Graube | 350/3.61 X |
| 4,171,766 | 10/1979 | Ruell | 350/3.6 X |
| 4,173,474 | 11/1979 | Tanaka et al. | 350/3.61 X |
| 4,217,405 | 8/1980 | Benton | 430/2 |
| 4,681,324 | 7/1987 | Karabed et al. | 350/3.6 X |
| 4,684,795 | 8/1987 | Colgate | 430/2 X |
| 4,725,111 | 2/1988 | Weitzen et al. | 350/3.6 X |
| 4,788,115 | 11/1988 | Long et al. | 430/2 |

FOREIGN PATENT DOCUMENTS

| | | |
|---|---|---|
| 0230208 | 7/1987 | European Pat. Off. . |
| 283233 | 9/1988 | European Pat. Off. . |
| WO82/01595 | 5/1982 | PCT Int'l Appl. ............... 350/3.61 |
| WO85/01127 | 3/1985 | PCT Int'l Appl. . |
| 86/05071 | 9/1986 | PCT Int'l Appl. . |
| 2136352 | 9/1984 | United Kingdom . |
| 2208016 | 2/1989 | United Kingdom . |
| 2181993 | 5/1989 | United Kingdom . |

Primary Examiner—Bruce Y. Arnold
Assistant Examiner—David R. Parsons
Attorney, Agent, or Firm—Darby & Darby

[57] ABSTRACT

An article has a light-transparent visual display feature through which a graphic design or a solid object can be seen, the light-transparent visual display feature is a light-transparent film sheet which contains a Lippman-Bragg reflection hologram which has a viewing angle of not more than 20° on either side of a selected viewing axis or axes and a depth of holographic image which is not more than 5 mm on one side or the other of the image plane. When the article is a package, the restricted view is provided around a vertical axis relative to the observer so that as an observer passes the illuminated package laterally witth the hologram on the vertical face, the hologram will suddenly come into view and just as suddenly slip from view as viewing angle is passed. When the article is an identification or credit card, the transparent film material bearing the hologram is laminated to the top surface of the card which bears a graphic design relevant to the holder of the card. The graphic design is visible at all times, but the holographic image appears and then disappears as the viewing angle of the card changes.

8 Claims, 2 Drawing Sheets

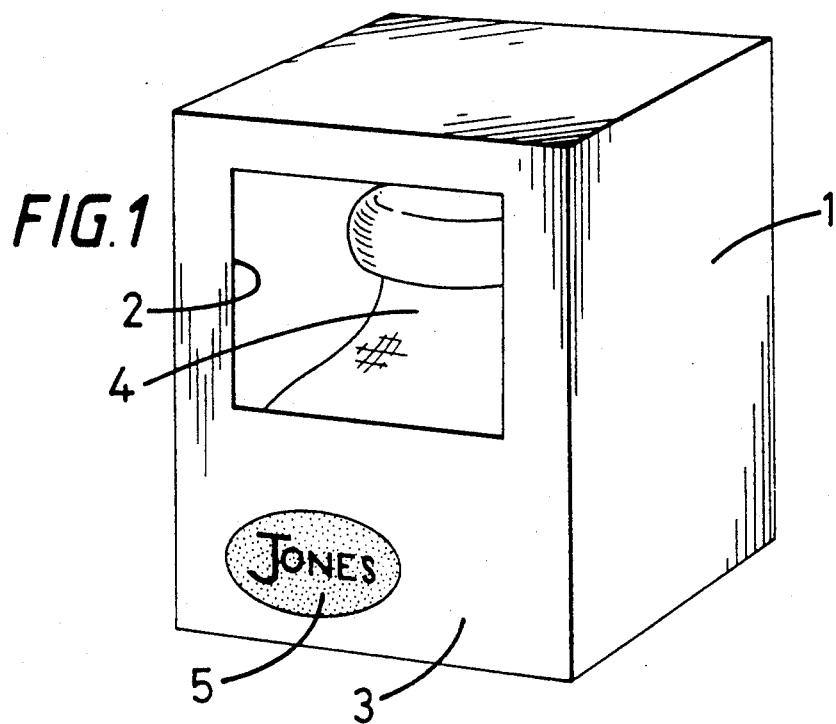
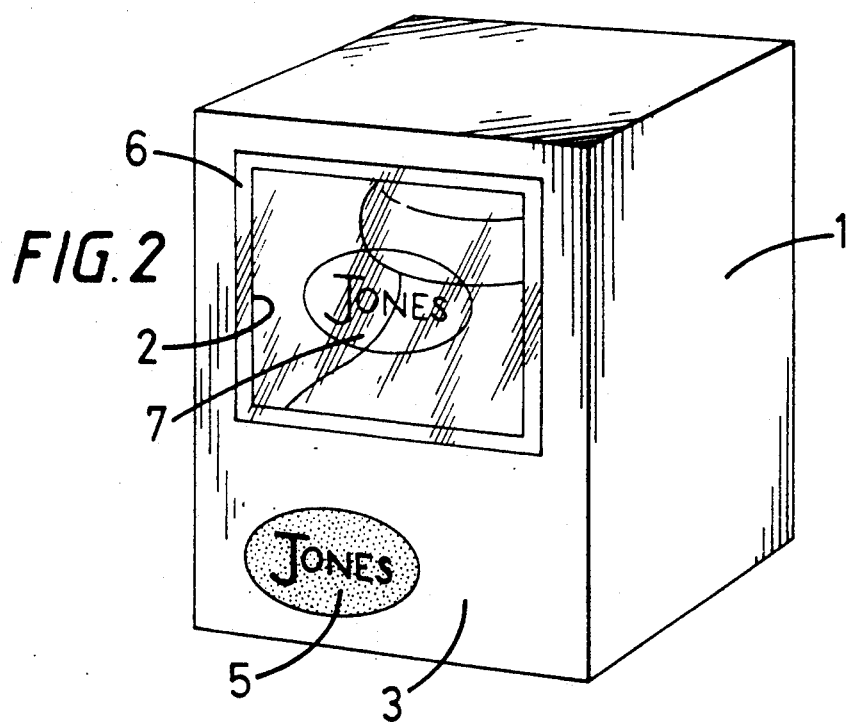

HOLOGRAMS FOR PACKAGING AND DISPLAY USES

BACKGROUND OF THE INVENTION a. Field of the Invention

This invention relates to holograms. More particularly the invention concerns holograms used in connection with packaging means and for display purposes.

b. Nature of the Technical Arts

In recent years considerable money and effort have been spent in the packaging of articles in order to make the packaged goods more appealing to consumers in outward appearance when the goods are on store shelves. Apart from using colored papers, ribbons, shaped containers and the like, this consumer appeal has been enhanced by the graphics or graphic designs used on the packaging. To complement such graphics use has been made of embossed holograms. However, the apparent color of an embossed hologram is strongly dependent on the angle between the observer and the plane of the hologram, or the angle between the plane of the hologram and the illuminating light source.

Because of these dependencies, often the effect is neither pleasing nor eye-catching. Furthermore, embossed holograms require a silvered or reflective backing and this reflective backing often detracts from the overall packaging design or concept. Moreover, such holograms are difficult to observe in poor lighting conditions.

It is also known to incorporate a hologram as a security feature in an identification card or credit card. The hologram usually takes the form of a small embossed hologram in one corner of the card. In practice, such holograms are rarely very striking in appearance.

SUMMARY OF THE INVENTION

It is an object of the present invention to provide a packaging means for consumer goods, the packaging means including a hologram. More specifically, it is an object to incorporate a hologram which does not suffer the aforementioned drawbacks found in prior art holograms.

It is an object to provide a hologram which is striking in appearance when used in connection with packaging means for products, or with identification or credit cards.

It is another object of the invention to provide a hologram for graphic design uses which is appealing to the eye in low or poor lighting conditions.

According to the present invention, an article comprises on its outer side a light-transparent visual display feature through which a graphic design or a solid object inside the article can be seen. The light-transparent visual display feature comprises a light-transparent film sheet which contains a Lippman-Bragg reflection hologram which has a viewing angle of not more than 20° to either side of a selected viewing axis or axes and a depth of holographic image which is not more than 5 millimeters (mm) on one side or the other of the image plane.

Preferably, the viewing angle is not more than 20° about any two non-parallel axes in the plane of the hologram. In the case of a hologram displayed on a vertical plane, this means that the image can only be viewed from a range of positions restricted in the horizontal and/or vertical planes. Outside this range the hologram does not produce any apparent image.

As a result, however, the hologram appears very bright even when viewed under dim or non-specific lighting conditions. The small depth of the holographic image causes the hologram to appear very sharp in visual definition.

According to another aspect of the invention, a transparent film material bearing the hologram is laminated onto the top surface of an identification card, credit card or the like. The card bears a graphic design which is visible through the transparent film at all times. The holographic image is selectively apparent to the viewer, however, only at certain angles of viewing. Advantageously, the holographic image may complement or complete the underlying graphic design of the card.

BRIEF DESCRIPTION OF THE DRAWINGS

The accompanying drawings will serve to illustrate the invention.

FIG. 1 is a perspective view of a box containing articles with a cut-out portion.

FIG. 2 is the same perspective view of the base of FIG. 1 with the cut-out portion covered with a sample of the hologram.

DETAILED DESCRIPTION OF THE PREFERRED EMBODIMENTS

Figure 3:
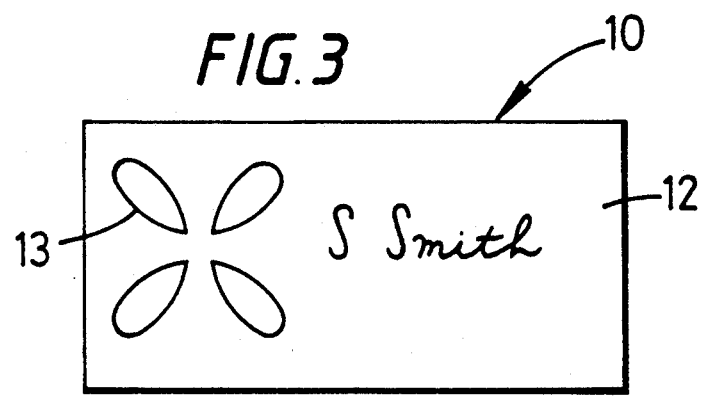
FIG. 3 is a top view of an identification card having a graphic design thereon.

Briefly referring to the drawings, so that the following description will be more readily understood, FIG. 1 shows a cardboard box 1. A cut-out portion 2 is formed in one face 3 thereof by any suitable conventional manner. Through this cut-out portion 2 can be seen the neck of a bottle 4 which is contained in the box 1. The manufacturer's company logo 5 may be printed on the face 3 of the box 1 as shown.

While FIG. 1 shows a specific package for a specific product, it should be clear that the invention is not limited to any particular package shape or type of package or product contained therein. The figures are entirely illustrative only.

In FIG. 2, a transparent film 6 comprising a hologram 7 has been adhered over the cut-out portion 2 of the box 1 of FIG. 1. The box 1 is illustrated at a viewing angle at which the holographic image of the hologram is visible. A brilliant image of the logo "JONES" is shown approximately over or in front of the neck of the bottle 4. According to the invention, however, as the angle of viewing is changed this logo would disappear.

The transparent film 6 has been shown in FIG. 2 covering the outside of the cut-out portion 2. In practice, the transparent film 6 is preferably adhered to cover the cut-out portion 2 on or from the inside of the box 1.

The package of the present invention is preferably a box made from cardboard, stiffened paper or sheet plastic material or other self-supporting material which can be fabricated into a box.

A particular package of the present invention comprises a covering for consumer articles or the like having a transparent window in the covering through which the articles contained therein can be seen, the transparent window comprising a Lippman-Bragg reflection hologram which has a viewing angle of not more than 20° to either side of the normal and a depth of holographic image which is not more than 5 mm on one side or the other of the image plane.

Preferably, as shown, the package is a cardboard box 1 with a portion 2 cut out of one side through which the contents of the package are visible. A transparent holographic material 6 which comprises a hologram as just defined covers this cut-out portion 2. If the hologram is present on a sufficiently thick film base, that is to say, at least 60 micrometers (um) then the holographic material itself may be used to cover the cut-out portion. If, however, the hologram to be used is provided on a thinner film base then a transparent film sheet which is at least 60 um thick should be used to cover the opening and the holographic material which comprises the hologram should be laminated to this sheet.

When such a box according to FIG. 1 is displayed with incident light at a suitable angle the contents of the box are visible through the cut-out portion. As an observer passes the box, the hologram on the cut-out portion 2 will switch on and off depending on the position of the observer.

Another package of the present invention is preferably a box, at least one side of which comprises a reflection hologram adhered thereto, as hereinbefore described. This side or even the whole box can comprise no printed matter and may be of a single color, for example, black or white. The hologram can then comprise all the required information such as the name of the product and its manufacturer. Thus, initially the box appears to have no information on it but as an observer passes it, suddenly the requisite information will appear and then disappear.

Alternatively, the sides of the box may comprise the usual information about the product and over one side of the box, a hologram as hereinbefore defined may be laminated to the box or to a film sheet which covers the box. Thus, under normal lighting conditions present in a store, the information about the contents of the box will be visible but as an observer passes by, additional information will switch on and then disappear.

A particularly pleasing effect is obtained if the information contained on the hologram is exactly the same as some of the information on the side of the box, for example, the manufacturer's name and name of the product. The hologram should then preferably be affixed to the box so that the information in the hologram is exactly in register with the similar information on the box. As so constructed, under the normal lighting conditions in most viewing positions, the observer will see on the box the usual information. Then, as the observer passes the box, the most important information will suddenly be reinforced and then diminished.

Figure 4:
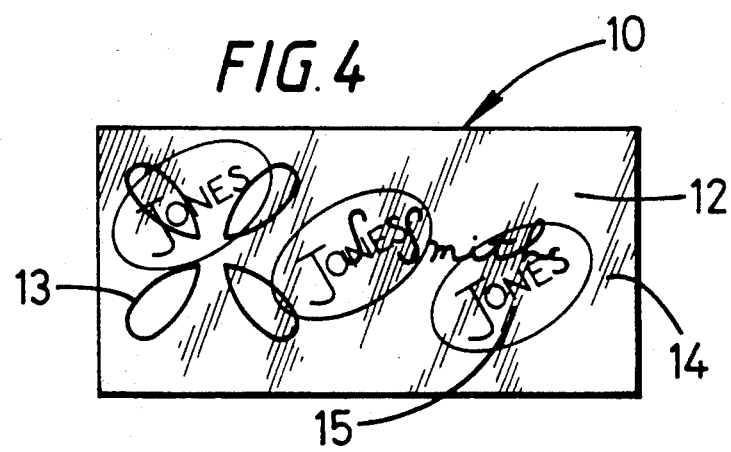
FIG. 4 is the same top view of the card of FIG. 3 with a light-transparent film material bearing a hologram laminated thereto.

Another preferred embodiment is illustrated in FIGS. 3 and 4 which depict an identification card 10. The card 10 comprises laminated plastic sheets which may have a white top surface 12 which carries a graphic design 13. As illustrated in FIG. 4, a transparent film 14 comprising the hologram 15 has been affixed to cover the whole top surface 12.

The whole of the graphic design 13 can be seen through the transparent film 14. The logo "JONES" is shown on the film 14. However, as the angle of viewing is changed, this logo would disappear.

The light-transparent film sheet 14 according to the invention contains a Lippman-Bragg reflection hologram which has a viewing angle of not more than 20° to either side of a selected viewing axis or axes and a depth of holographic image which is not more than 5 millimeters (mm) on one side or the other of the image plane.

When the article of the present invention is a card, the transparent film material bearing the hologram is laminated on to the top surface of the card which bears a graphic design relevant to the holder of the card. The holographic image may be the name of a firm or organization. This acts as an additional security overlay. The graphic design is visible at all times when the card is inspected, but the holographic image appears and then disappears as the viewing angle of the card changes as the card is being inspected. Instead of the name of the firm, additional security may be provided if the holographic image complements or completes the graphic design on the card. When used in this way, the holographic security image can be as large as the physical dimensions of the card without detracting from the space allocated to the conventionally printed graphics present on the card.

The article of the present invention may also be any other flat surface on which there is present a graphic design. Over this design there is present the light-transparent film sheet bearing the hologram. The graphic design is visible the whole time through the film sheet but the hologram is only visible at certain viewing angles. The hologram may relate to the graphic design or it may convey a message not related to the graphic design For example, the graphic design may be a card bearing no letters but only a picture of a dog. The hologram in this case can be of the letter 'D' through which the picture of the dog is visible. The letter 'D' will not normally be visible, but as a child alters the viewing position of the card, the letter 'D' will appear and then disappear, thus emphasizing the relationship between the dog and the letter 'D'.

Preferably, the viewing angle is not more than 20° about any two non-parallel axes in the plane of the hologram. In the case of a hologram displayed on a vertical plane, this means that the image can only be viewed from a range of positions restricted in the horizontal and/or vertical planes. Outside this range the hologram does not produce any apparent image.

As a result, however, the hologram appears very bright even when viewed under dim or non-specific lighting conditions. The small depth of the holographic image causes the hologram to appear very sharp in visual definition.

As used herein, a Lippman-Bragg reflection hologram is a hologram in which the interference fringes are substantially perpendicular to the light rays used to reconstruct the image. This usually means that the fringes are parallel to the plane of the base on which the photosensitive layer is coated. Such holograms are also known as "volume holograms" as the fringes which provide reconstruction of the holographic image are in the depth of the photosensitive layer rather than on the surface as is the case with embossed holograms.

A particularly useful Lippman-Bragg hologram for use in the present invention can be prepared from silver halide photosensitive materials where the silver halide crystals used range from about 0.02 to 0.05 micrometers (um) average particle size. Bright holographic images can be obtained using lasers to expose the material and processing the material using a silver halide developing solution followed by a rehalogenating bleach. The rehalogenating bleach bath bleaches out the exposed silver formed during the silver halide development process and redeposits this dissolved silver within the material. The use of a He:Ne laser which has a peak emission wavelength of 633 nanometers (nm) results in a hologram which replays at about 600 nm and which exhibits a reddish-gold color which is particularly effective for display purposes.

Other photosensitive layers from which Lippman-Bragg holograms may be prepared include dichromated gelatin and photopolymers.

U.S. Pat. No. 4,173,474, incorporated herein by reference, describes a method for forming a hologram using a photopolymerization mixture. Another such system is described in WO 85/01127 but in that case the branched polyethylenemine serves both as the polymerization initiator and as the hydrophilic water-swellable binder.

The required narrow viewing angle may preferably be obtained by increasing the distance of the transmission master when the reflection master is being prepared, or by using a small transmission master at the customary distance from the reflection master. In either case, the narrow viewing angle is a result of the narrow solid angle subtended by the transmission master at the reflection master during its preparation. Reflection holograms prepared in this way will only be visible though the solid angle defined by the position of the transmission master.

For very small viewing angles the image may fall only on one of the observer's eyes at a given viewing distance. This may be disconcerting for the observer and it is preferable that the reflection master is designed to replay the same image into both of the observer's eyes at the expected viewing distance. In practice, this may set a limit on the smallest angle of view around a vertical axis which is generally acceptable. A narrow angle of view around a horizontal axis relative to the observer is likely to be more generally acceptable. The required small depth of the holographic image may be obtained by selection of a suitable image and preparation of a suitable transmission master therefrom. Preferably the depth of the holographic image is less than 2 mm from one side or the other of the image plane. Thus, what is achieved is in essence a bright two-dimensional hologram which switches on and off rather than a three-dimensional holographic image which appears to be suspended in space in front of the holographic material which comprises the interference fringes.

Holograms of this type can be reconstructed, that is to say, made visible, using diffuse lighting and, in particular, fluorescent lighting as is usually present in stores in which packaged articles are on display.

When the article of the present invention is a package for a consumer product or the like, the restricted view is advantageously prepared to be around a vertical axis relative to the observer so that as an observer passes the illuminated package laterally with the hologram on the vertical front face thereof, the hologram will suddenly come into view and just as suddenly slip from view as the viewing angle is passed.

If the restricted view is about a horizontal axis it means that as an observer raises or lowers his eyes the hologram will suddenly come into view and then disappear again. If the restricted view is around both horizontal and vertical axes then there is effectively only one viewing position. Thus, from the point of view of enhancing display of goods on a shelf preferably the viewing angle is restricted to not more than 20° on either side of a selected axis or axes. Thus the viewing angle can be as small as 5° but in that case the hologram is only visible for a very short time as the observer passes the package. If a plurality of packages each comprising one hologram on its vertical front face are placed in line on a store shelf as an observer passes the packages, first one hologram and then the next one and so on will switch on and then off providing a very eye catching display. These holograms can all be the same or may be different, in the latter case providing a sequential message.

Alternatively, each package may comprise, for example, two holograms which switch on at different angles of view. These holograms can be on different areas of the package or on the same area and can be illuminated by alternating spot lamps.

In the holographic material used in the present invention, the supporting base may be any transparent base used in the photographic industry, for example biaxially oriented polyethylene terephthalate or polycarbonate or a cellulose derivative such as cellulose triacetate.

The photosensitive layer may have been coated on the base by any of the conventional techniques well known to the photographic industry such as by use of a doctor bar, or by slot, cascade curtain or dip methods. The coated layer may then be dried by normal hot air methods. When the material is a dichromated gelatin hologram (D.C.G. hologram) the coated gelatin layer is sensitized with a dichromate solution just before it is holographically exposed.

In order to produce the required hologram exhibiting both brightness and sharpness and having a restricted viewing angle of not more than 20° either side of the normal and a depth of holographic image which is not more than 5 mm on one side or other of the image plane, a lengthy process requiring the production of intermediate masters is usually required. For example, if a company's logo is required to be present on the hologram, a bas-relief model of the logo having a black background is prepared. This is used as the object to prepare a master transmission hologram using silver halide holographic material coated on a film base, and a He:Ne laser. After processing, this master transmission hologram is used to prepare a reflection master. During this exposure (also using a He:Ne laser) the distance between the transmission master and the holographic material may be selected to achieve the desired narrow viewing angle, as already described hereinabove.

The holographic material is then processed to achieve a replay wavelength of 633 nm and the highest possible reflectivity. When a hologram is exposed to a laser of a certain emission peak wavelength, usually it will replay at a lower wavelength. In European patent application Nos. 225,852 and 230,208, however, methods of increasing the replay wavelength of processed holograms are described. The reflection hologram of the required replay wavelength may then be laminated between two sheets of glass to prevent atmospheric moisture from swelling the gelatin binder and thus altering the replay wavelength. This is then the reflection master. A large number of copy reflection holograms can then be prepared from this reflection master by well known contact printing methods.

EXAMPLE OF A HOLOGRAM FOR USE IN THE PRESENT INVENTION

Samples of holographic material were prepared by coating onto a transparent photographic film base a gelatin silver halide emulsion which was substantially pure silver bromide having a mean crystal size of 0.03 um at a silver coating weight of 30 milligrams per square decimeter (mg/dm2). The emulsion was optically sensitized w a red sensitizing dye so that it was optimally sensitive to 633 nm, the color of a He:Ne laser.

A model of a company logo "JONES" was then prepared and a transmission master hologram was prepared therefrom using a sample of the holographic materials as just described. The exposed material was then developed for 2 minutes in a solution of the following formulation:

| Sodium Sulphite Anhydrous | 30 g |
|---|---|
| Hydroquinone | 10 g |
| Sodium Carbonate | 60 g |
| Water to | 1000 ml |

The developed sample was then transferred to a rehalogenating bleach bath of the following composition:

| Fe (NH4) EDTA (1.8 m Solution) | 150 mls |
|---|---|
| KBR | 10 g |
| pH | 5.5 |
| Water to | 1000 mls | until all the silver metal had been bleached out, which took about 2 minutes.

After washing and drying the transmission master thus prepared was used to prepare the reflection master in the manner as described above using a He:Ne laser. The relative positions of the transmission master and the sample of holographic material were adjusted to ensure that the exposed and processed hologram had a narrow viewing angle of 6° on either side of the normal. The depth of image was less than 2 mm in front of the image plane. Processing was as set forth above, but the method described in EP 225,852 and also in corresponding U.S. Pat. No. 4,788,115 (which is incorporated herein by reference), was employed after the rehalogenating bleach bath to restore the peak replay wavelength to 633 nm.

The resulting hologram was laminated between two glass plates to constitute the reflection master. This reflection master was then used to prepare a large number of copy holograms using a contact copying process and exposing with a He:Ne laser. The development and rehalogenating bleach bath were as set forth above. The replay wavelength of these copy holograms was found to be 600 nm which is a rich gold color. Thus the logo "JONES" was present on the transparent film base as a rich gold color. The hologram had a viewing angle of 6° and depth of image 2 mm in front of the image plane.

We claim:

1. A package comprising:
a light-transparent visual display through which an object can be seen, the light-transparent visual display comprising a light-transparent film sheet which includes a Lippman-Bragg reflection hologram having a viewing angle of not more than 20° measured from at least one selected viewing axis which passes through the light-transparent film sheet and a depth of holographic image which is not more than 5 millimeters on either side of the light-transparent film sheet.

2. The package of claim 1, the package having an inside and at least one side, the side having a transparent window therethrough through which an object, when said object is contained inside the package, can be seen, the transparent window comprising the light-transparent visual display.

3. The package of claim 2, the package being a cardboard box with a cut-out portion in the side for receiving the light-transparent visual display.

4. The package of claim 1, the package begin a box at least one side of which comprises the light-transparent visual display.

5. The package of claim 4 wherein a visual image of the hologram is the same as some information on the box and wherein the light-transparent film sheet is affixed to the box so that the visual image of the hologram is in direct alignment with the same information on the box.

6. The package of claim 1 wherein the Lippman-Bragg hologram comprises one of a group of materials selected from the group consisting of silver halide sensitized material, dichromated gelatin and photopolymerization mixture.

7. The package of claim 6 wherein the silver halide sensitized material contains silver halide crystals having a average particle size ranging from 0.02 to 0.05 micrometers.

8. The package of claim 7 wherein the hologram is prepared using He:Ne laser and is processed in a silver halide development bath followed by a rehalogenating bleach bath.

* * * * *